June 6, 1967  A. V. FRAIOLI  3,323,358
SOLID STATE PRESSURE TRANSDUCER
Filed June 2, 1964  3 Sheets-Sheet 1

INVENTOR.
ANTHONY V. FRAIOLI
BY
*Herbert L. Davis*
ATTORNEY

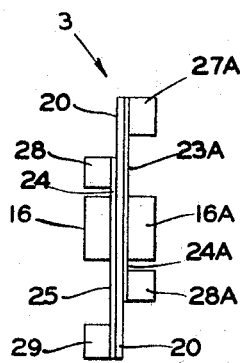
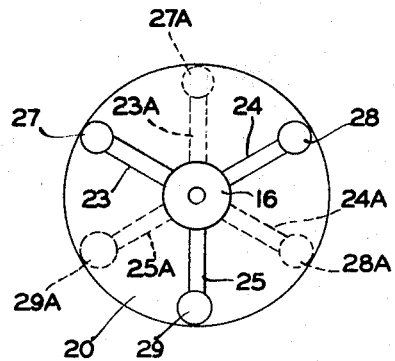
FIG. 5  FIG. 6
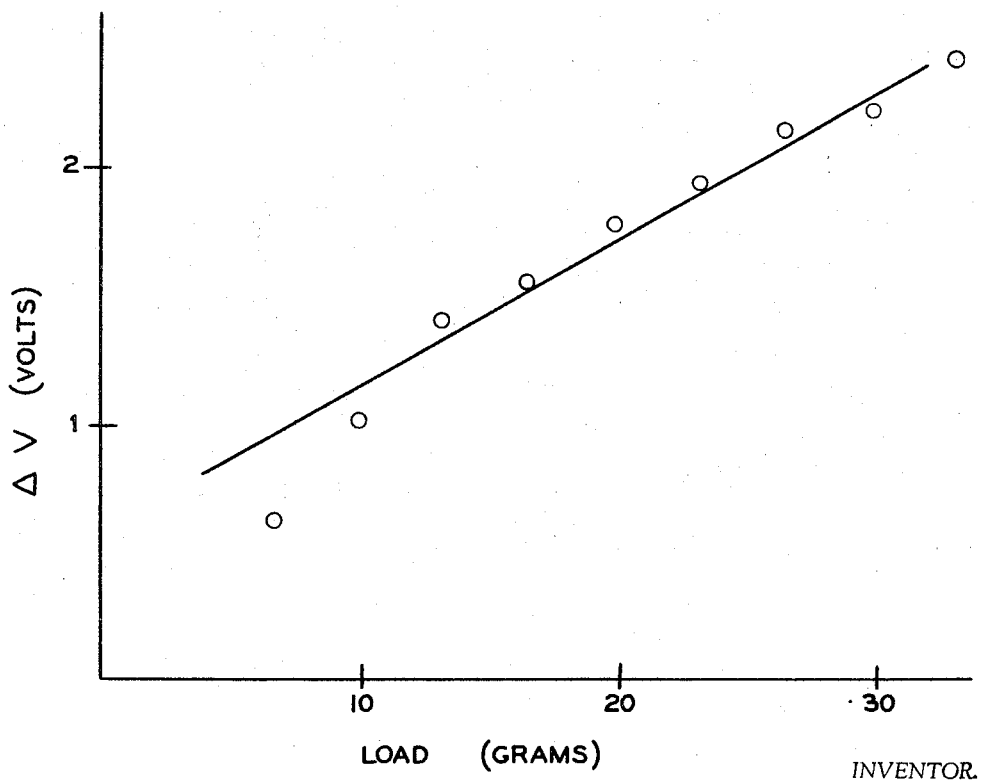
FIG. 7

INVENTOR.
ANTHONY V. FRAIOLI
BY
ATTORNEY

United States Patent Office 3,323,358
Patented June 6, 1967

3,323,358
SOLID STATE PRESSURE TRANSDUCER
Anthony V. Fraioli, Essex Fells, N.J., assignor to The Bendix Corporation, Teterboro, N.J., a corporation of Delaware
Filed June 2, 1964, Ser. No. 372,071
14 Claims. (Cl. 73—141)

This invention relates to a solid state pressure transducer and more particularly to a solid state pressure transducer including a pair of diaphragm wafers formed of a semiconductor material in a clamshell like construction having an insulated contact supporting device mounted therein and arranged in cooperative relation to a centrally disposed mesa junction in each of the wafers and a plurality of mesa feedthroughs positioned in the wafers and about the mesa junction.

The invention further relates to a provision of novel means for effecting direct transducing of pressure in a solid state piezodiode system which may be utilized in various types of transducers such as motion sensing devices, accelerometers, and other instruments for measuring movements, forces, pressures, torques accelerations, and the like. Heretofore, semiconductor material such as silicon and germanium have been used as pressure transducers in strain gauge elements, but problems have arisen in that the small voltage outputs of such semiconductor elements have required amplification. Also introduced are the hysteretic effects of the diaphragm or bending beam to which the transducer may have been cemented.

Moreover, prior art semiconductor strain gauge elements of the bonded type have suffered from hysteresis and inefficient coupling to the system, while prior art unbonded semiconductor strain gauge elements are difficult to fabricate and couple to the system.

In the semiconductor art, a region of semiconductor material containing an excess of donor impurities and having an excess of free electrons is considered to be an N type region while a P type region is one containing an excess of acceptor impurities resulting in a deficit of electrons, or stated differently, an excess of holes.

When a continuous solid specimen of crystal semiconductor material has an N type region adjacent to a P type region, the boundary between them is termed a PN punction, and the specimen of semiconductor material is termed a PN junction semiconductor device.

The term junction as used herein is intended to include also the boundary between a P region or an N region and an intrinsic region. Additionally, the term junction as utilized herein is intended to include the boundary between any combination of P, N, I, and N+ which results in an electrical conductivity barrier between any two such adjoining regions which differ in the mode of current transport.

A region heavily doped with an N type conductivity active impurity is designated as an N+ region, while a region heavily doped with a P type material is designated as a P+ region, the + indicating that the concentration of the active impurity in the region is somewhat greater than the minimum required to determine the conductivity type. In an intrinsic region the holes and electrons are in balance and hence it cannot be said to be of either N type or P type conductivity.

In the present invention, the solid state pressure transducer provided has utilized a reverse biased diode in a mesa junction formed in the semiconductor material of the wafer diaphragm so that pressure applied to the wafer diaphragm effects through a contactor mounted therein and bearing on the mesa junction the voltage-current characteristics of the diode to provide a relatively large linear output signal voltage excursion so that amplification sensitivity is not a problem, and secondly, in the arrangement of the present invention, the diode is not mechanically coupled to the diaphragm but rather the base of the diode is extended to form an integral part of the diaphragm or wafer in that the diode is grown into the center of the semiconductor diaphragm wafer which may be of a silicon material, and which like quartz and germanium, is notably free from hysteretic effects so that upon flexure, such materials deform elastically without exhibiting plastic (hysteretic) deformation.

Piezodiodes have been described as incorporated into extremely small hydrophone and microphone devices which satisfactorily respond to an oscillating input. However, D.C. outputs provided by steady applications of pressure onto the diodes through a hemispherically tipped phonograph stylus have shown nonrepeatability and damage to the junction.

A reversible reduction of breakdown voltage is observed when isotropic uniaxial stress is applied to silicon PN junctions. This effect has been reported in junctions exhibiting uniform avalanche breakdown. The normalized reduction of breakdown voltage $\Delta V/V_B$ is proportional to stress, the proportionality constant being of the order of $10^{-12}$ dyne$^{-1}$ cm.$^2$. When stress is applied by means of a flat stylus, $\Delta V/V_B$ is proportional to the load, when a spherical stylus is used, $\Delta V/V_B$ is proportional to the cube root of the load. It can be shown that the relative current change for a given force is to a first approximation independent of diode area and breakdown voltag $V_B$. It is thought that the effect is caused by reduction of the energy gap.

The data shown in FIGURE 7 were obtained by uniaxially stressing a reverse-biased junction not exhibiting uniform avalanche breakdown, and prepared so as not to be "micro plasma-free," that is, free of breakdown in localized spots. These data show that with the purposeful creation of dislocations and faults in the junction through well-known mechanical techniques, piezo-diodes can be prepared in a wide range of sensitivities, all substantially stable and hysteresis-free with sensitivities ranging from an apparent low limit of the $1 \times 10^{-12}$ dyne$^{-1}$ cm.$^2$ proportionality constant reported for micro-plasma-free devices to the $5 \times 10^{-8}$ dyne$^{-1}$ cm.$^{-2}$ proportionality constant device (50,000 times greater sensitivity) referred to in FIGURE 7, and higher. It is further evident that this sensitization can be imparted to the piezodiode in a manner which provides for an augmented output when stressed with the flat probe. Previously, these outputs had only been obtained by stressing piezodiodes with hemispherically tipped styli and resulted in an unwieldy response linear to load to the one-third power, along with a hysteretic response and irreversibly altered electrically characteristics under conditions of overload.

An object of the invention is to provide a structure designed to avoid the aforenoted deficiencies and a solid state pressure transducer for effecting steady state linear D.C. outputs.

Another object of the invention is to provide a balanced pressure transducer including a probe of a relatively hard material such as chrome steel or the like, having a flat surface arranged in cooperative relation to an underlying mesa diode of smaller diameter so as to avoid the generation of shear lines in the mesa junction upon the application of pressure through the probe.

Another object of the invention is to provide in cooperation with a mesa junction formed of a semiconductive material a probe or contactor having a flat surface of larger diameter than the mesa junction so as to prevent the generation of possible shear lines of force going down through the space-charged region which might otherwise lead to unstable outputs and an arrangement such that the mesa junction may be flushly contacted by the probe without distortion upon the application of pressure therethrough.

Another object of the invention is to provide a novel solid state pressure transducer including therein a probe of a relatively hard metal having a flat surface cooperatively arranged in relation to a mesa diode of smaller diameter than the flat surface of the probe and centrally grown into a silicon wafer which serves as the pressure sensitive element of the transducer so as to effect (a) linear response to load; (b) long-term stability of signal (use for D.C. purposes); (c) resistance to damage by overload; (d) hysteresis-free response.

Another object of the invention is to provide a novel solid state transducer of a so-called novel clamshell construction including a pair of diaphragm wafers of silicon which may be rim alloyed with gold and then fusion sealed under vacuum, after being rim stressed about an interposed inner contact support plate formed of a suitable electrical insulating material and carrying at opposite sides thereof relatively hard polished flat steel probe contactors, affixed to the contact support plate and arranged so as to cooperate with a PN mesa junction centrally formed in each of the silicon wafers so as to vary the electrical conductive effect thereof with changes in pressure applied to the exterior surface of the silicon wafers.

Another object of the invention is to provide in such a solid state pressure transducer an insulating contact support plate including two Y-shaped electrical conduction paths provided at opposite sides of the support plate and electrically connecting centrally disposed chrome steel or the like contactors to copper or nickel or the like conduction pads at the ends of the Y-shaped conduction paths, the conduction pads being arranged to electrically connect with mesa feedthroughs provided in the silicon wafers and arranged about the centrally disposed mesa junction.

Another object of the invention is to provide a solid state pressure transducer of silicon wafers of the balanced so-called clamshell construction so as to uniquely provide acceleration and vibrational stability due to a novel dual-diode symmetrical construction.

Another object of the invention is to provide a solid state pressure transducer including a crystal silicon wafer utilized as the pressure responsive structural elements and in which the transducer is grown integrally therein.

Another object of the invention is to provide in such a silicon pressure transducer electrical feedthroughs in a silicon wafer arranged in cooperative relation to a contact support plate positioned within the silicon wafer construction of the transducer in cooperative relation with a piezodiode centrally grown in the silicon wafer.

Another object of the invention is to provide a novel solid state pressure transducer of the aforenoted so-called clamshell construction in which conductors from the mesa feedthroughs on the outer surfaces of the wafers have been formed in the shape of an open ended triangle arranged in relation to a conductor leading to the mesa junction so as to indicate symbolically the anode and cathode terminals to and from the mesa junctions centrally grown in the wafers.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

In the drawings:

FIGURE 5 is an enlarged side view of the contactor support plate of FIGURE 1.

FIGURE 6 is a top plan view of the contact support plate of FIGURE 5.

FIGURE 7 is a graphical illustration showing the linear relation of the voltage output from a pressure transducer utilizing a flat surface probe such as show in FIGURE 1 for changes in the load pressure applied through the probe.

Figure 2:
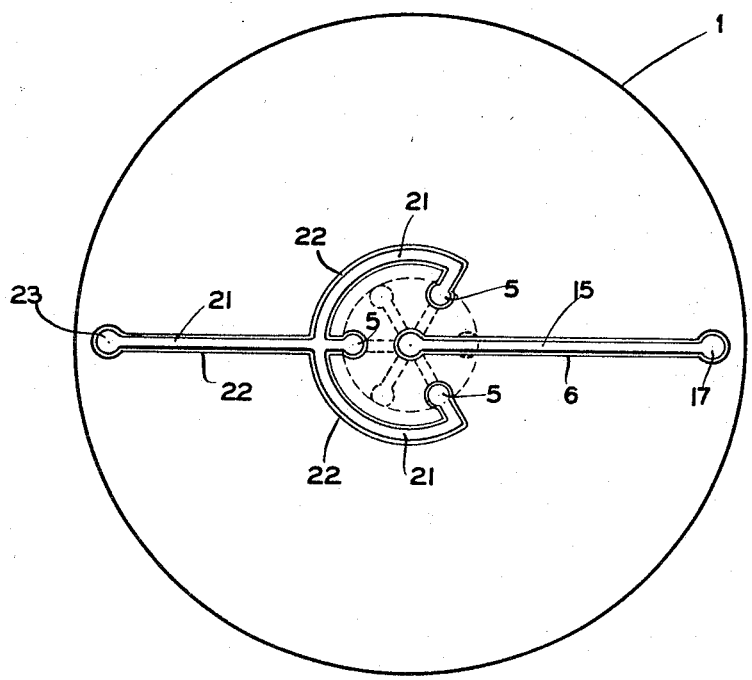
FIGURE 2 is a top plan view of the solid state pressure transducer of FIGURE 1.
Figure 8:
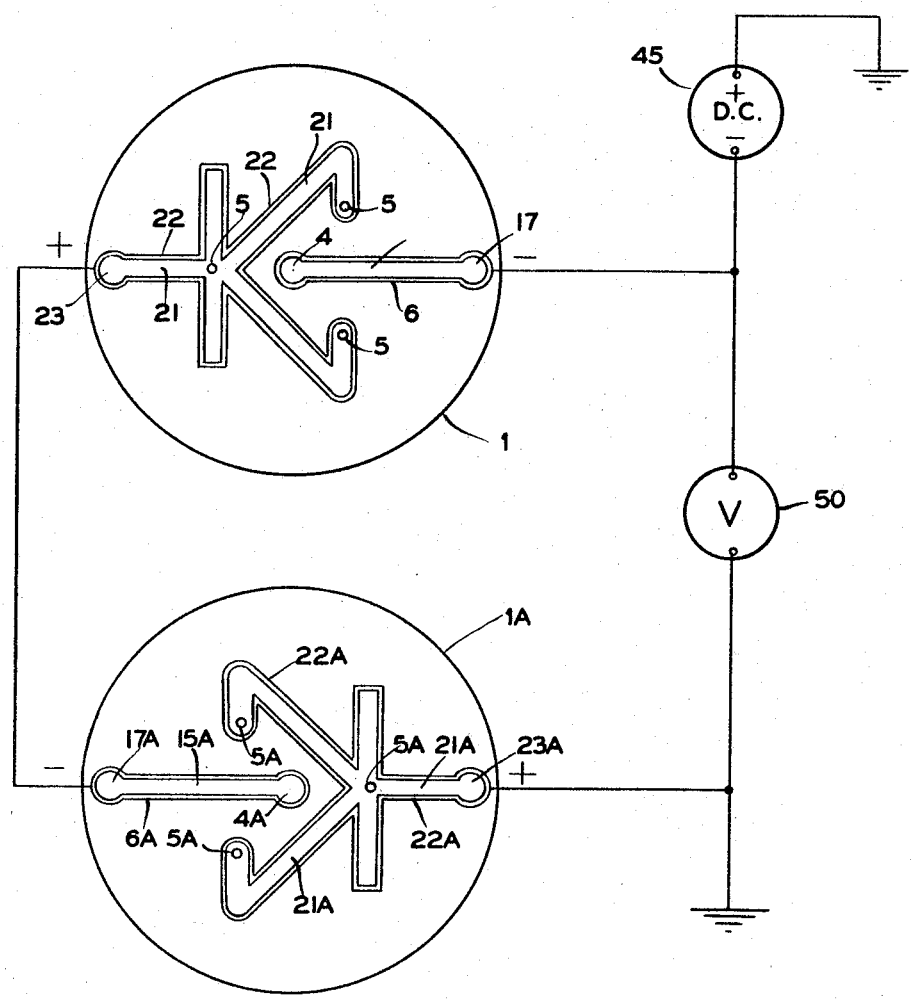

FIGURE 8 is a view of a modified form of the pressure transducer of FIGURE 2 showing the outer surfaces of the opposite diaphragm wafers and the novel arrangement of the conductors from the mesa feedthroughs in the configuration of an open ended triangle arranged in relation to the conductor leading to the mesa junction so as to indicate symbolically the anode and cathode terminations, respectively, of the piezodiodes in the electrical circuit shown diagrammatically in the drawing.

Figure 1:
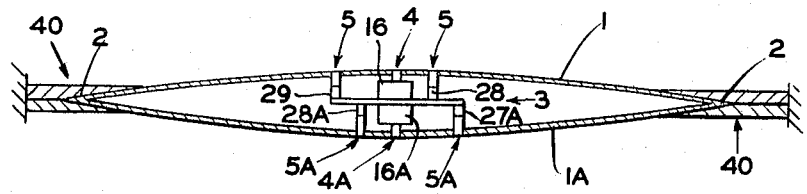
FIGURE 1 is a sectional view of a solid state pressure transducer embodying the present invention.

Referring to the drawing of FIGURE 1, the pressure transducer is constructed of two circular wafers 1 and 1A formed of a P type silicon material. Each of the wafers 1 and 1A may be, for example, of a one inch diameter having a thickness of approximately three to five mils or more, depending on the pressure range to be measured. The wafer 1A is of like construction to the wafer 1 and has corresponding parts bearing like numerals to which have been added the suffix A. The silicon wafers 1 and 1A may be fastened together at the outer circumferential edges thereof and rim alloyed with gold, as indicated by the numeral 2, and fusion sealed under vacuum. The circular wafers 1 and 1A are rim stressed about an interposed contact plate assembly 3 to provide the bowed outline of FIGURE 1.

Figure 3:
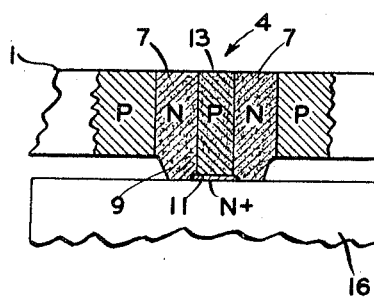
FIGURE 3 is an enlarged sectional view of the central mesa junction in the diaphragm wafers of the solid state pressure transducer of FIGURES 1 and 2.

Prior to assembly, a PN+ diode junction, piezodiode or mesa junction, indicated generally by the numeral 4 and shown in an enlarged view of FIGURE 3, is grown into each of the wafers 1 and 1A by planar techniques.

The planar techniques are well known in the art and may involve photographically defining a desired pattern on each surface of each of the wafers 1 and 1A and then chemically processing the wafer surfaces where the pattern will allow the process to continue. Deviating from planar technology, the planar structure is etched to form the mesa junctions 4 and 4A, shown in FIGURE 1, and the mesa feedthroughs 5 and 5A, also shown in FIGURE 1. An enlarged sectional view of the mesa junction 4 is shown in FIGURE 3, while an enlarged sectional view of the mesa feedthrough 5 is shown in FIGURE 4.

The chemical processes involve the penetration of the silicon material of the wafers 1 and 1A by active impurities coated or impinged onto the outer surface of the wafers 1 and 1A and baked at high temperatures so that penetration down into the wafers takes place. The term active impurities is used to denote those impurities which affect the electrical characteristics of semiconductor materials, as distinguished from other impurities which have no appreciable effect upon these characteristics. Active impurities for silicon are ordinarily classified as donor impurities such as phosphorous, arsenic, and antimony, or acceptor impurities such as boron, aluminum, gallium, and indium.

Figure 4:
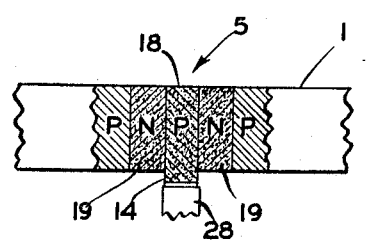
FIGURE 4 is an enlarged sectional view of a mesa feedthrough provided in the diaphragm wafers of the pressure transducer of FIGURE 1.

The aforenoted process then provides the P and N regions of differing conductivity characteristics, as shown in FIGURE 3, for the mesa junctions 4 and 4A and in FIGURE 4 for the mesa feedthroughs 5 and 5A.

In the mesa junction 4 of FIGURE 3, there is thus provided a diffused guard ring of N-type material, restricting the thin portion 11 of N+ material to a region in from the walls 7 of the mesa junction 4, so that the PN+ junction also resides in from the wall of the mesa. The guard ring 7 of the N-type material also provides electrical insulation of the P region 13 on the outer surface of the diaphragm wafer 1 and 1A. This P region 13 provides the external anode connection. An electrical conductive path 15 of gold or other electrical conductive material may be evaporated onto a suitable insulating undercoating or pad 6 of a material such as silicon monoxide or silicon dioxide provided on the outer surfaces of the wafers 1 and 1A. The conductive path 15 is arranged to electrically connect the outer surface of the region 13 to a point 17 adjacent the diaphragm edge of each of the wafers 1 and 1A for electrical connection purposes. Thus, the diode 4 is mesa-etched (diameter, for example, of approximately 75 microns) to sharply define the contact load area which supports the piezodiodes 4 and 4A under compression.

As shown in FIGURE 3, the mesa junction or the active element of the diode 4, is actually the region of the junction defined by the interface of the region 13 and the thin portion 11 of the N+ material. This interface region represents where the electrical activity of the device takes place. The guard ring 7 of N material which surrounds the P material of region 13 and the thin portion 11 of N+ material acts to isolate this active junction region.

Bearing upon the plateau 9 of the N material of the guard ring 7 and the thin N+ region 11 is a flat surface of a probe contactor 16 which may be formed of a hard chrome steel or similar material having a hardness somewhat less than or equal to that of silicon. A space charged region is developed upon electrification under the flat surface of the contact probe 16, and at the junction interface portion of the P and N+ material. It is the junction between the thin portion 11 of the N+ material and the P material of the region 13 which separates the different types of electrical conductive material, to wit, the N+ material having an excess of free electrons and the P material containing an excess of acceptor impurities resulting in a deficit of electrons or stated differently an excess of holes.

The flat surface of the metal probe 16 has a diameter greater than that of the plateau 9 and the application of pressure by the flat surface of the contactor probe 16 bearing on the plateau 9 of the mesa junction 4 induces a uniaxial stress therein so that the breakdown voltage on the mesa junction 4 is proportional to the load pressure applied thereto, as indicated graphically in FIGURE 7.

By the term uniaxial stress, it is meant that all stresses generated are perpendicular to the surface of the diodes and the loading probes 16 and 16A.

Post treatment of the mesa surface particularly the surfaces of the elements 11 and 11A of the mesa diodes 4 and 4A including abrasion, indentation by flat but microscopically roughened harder-than-silicon materials such as tungsten carbide, and sand blasting will physically sensitize the junction by the purposeful generation of faults and dislocations from the surface through the junction which tend to amplify the change in the electrical characteristic produced by a given uniaxial stress applied thereto by the smooth flat surfaces of the probe contactors 16 and 16A.

While the two wafers 1 and 1A are identically prepared and so that the diodes 4 are centrally located, as indicated in FIGURE 1, it should be understood that concurrently with the preparation or the etching of the mesa junctions 4 and 4A, the mesa feedthroughs 5 and 5A of the wafers 1 and 1A are similarly developed by chemical etching techniques.

The mesa feedthroughs 5, as shown in the enlarged view of FIGURE 4, include a conductive P-type material 18 isolated by a guard ring 19 of N-type material as in the diode construction shown in FIGURE 3. A gold alloy pad 14 is bonded to the inner mesa plateau of the P material 18 to provide a nonrectifying contact. For symmetry and redundancy there is provided in the wafer 1 three mesa feedthroughs 5 and in wafer 1A three mesa feedthroughs indicated by the numerals 5A. The three mesa feedthroughs 5 are externally connected by the electrical conductive material 18 to a conductive material 21 such as gold deposited on a suitable insulating undercoating or pad 22 of a material such as silicon monoxide or silicon dioxide. The conductive material 21 leads to a point 23 adjacent the outer edge of the wafer 1 opposite the point 17.

In the aforenoted arrangement, the element 18 of the P material is the conductive element while the ring 19 of the N material serves to insulate the conductive element 18 of the mesa feedthrough 5 from the P material of the silicon diaphragm wafer 1 so that current may be passed through the element 18 and provide means for making electrical connection to the mesa junction 4 of FIGURES 1 and 3 through the arrangement of the contact support plate 3, shown in FIGURES 5 and 6.

The contact support plate 3 may be fabricated of an electrical insulating material such as mica, indicated in FIGURES 5 and 6, by the disc 20. Affixed to the opposite sides of the insulating mica contact support plate 20 are polished chrome steel contactors 16 and 16A which are silver soldered to a gold interconnection path on both sides of the contact disc 20 and centrally located thereon. The contactors 16 and 16A are arranged to make contact with the cathode side of the diodes or mesa junctions 4 and 4A, as shown in FIGURE 1, and in the enlarged view of the mesa junction of FIGURE 3.

Deposited on one side of the mica disc 20, as shown in FIGURE 6, is a Y-shaped interconnection pattern including arms 23, 24, and 25 of gold electrical conduction lands leading from the probe-contactor 16 to the copper or nickel conduction pads 27, 28, and 29 also silver soldered to the gold interconnection pattern 23 adjacent the circumferential edge of the mica disc 20, as shown in FIGURE 6.

At the opposite side of the mica disc 20 similar gold electrical conduction lands 23A, 24A, and 25A lead from the chrome steel contactor 16A at the opposite side of the disc 20 to the corresponding copper or nickel conduction pads 27A, 28A, and 29A similarly affixed to the opposite side of the disc 20.

As shown in FIGURE 6, the Y-shaped arms 23, 24, and 25 are arranged 120° apart at one side of the disc 20 while the arms of the Y-shaped interconnection pattern 23A, 24A, and 25A are positioned at the opposite side of the disc 20 intermediate the arms of the Y-shaped pattern 23, 24, and 25 so that the oppositely disposed Y-shaped pattern of arms in effect interlock and provide an even distribution of all of the contact pads 27, 27A; 28, 28A, 29, 29A so that the pads 27, 28, and 29 make fused electrical connection with the gold alloyed pads 14 of the mesa feedthroughs 5 in the silicon wafer diaphragm 1 while the copper pads 27A, 28A, and 29A at the opposite side of the contact support disc 20 make fused electrical connection with corresponding gold alloyed pads of the mesa feedthroughs 5A provided in the silicon wafer diaphragm 1A, as shown in FIGURE 1.

It will be seen then that, as heretofore explained, the mesa feedthrough conductor elements 18 are in turn connected by the conductor 21 to the point 23 adjacent the edge of the wafer, and by a similar conductor at the outer surface of the wafer 1A, the conductor elements of the mesa feedthroughs 5A are connected to a point adjacent the outer edge of the wafer 1A.

In the aforenoted arrangement, the clamshell pressure sensor may have the silicon diaphragm wafers 1 and 1A of miniature size of, for example, one inch in diameter in which case the contact plate assembly 3 mounted therein may be constructed of approximately 1 mil cleaved mica of approximately 200 mils in diameter. The mica disc 20 serves to insulate the two Y-shaped gold conduction lands 23, 24, 25 and 23A, 24A, 25A evaporated or deposited onto opposite sides of the disc 20 with the polished flat surface chrome steel contactors 16 and 16A soldered to both sides of the disc 20 and arranged at the center of the Y-shaped conduction lands. The contactors 16 and 16A may have dimensions of approximately .050 inch in diameter and a height of .020 inch. The terminals of the arms of each of the Y conduction lands have similarly affixed thereto the copper or nickel conduction pads 27, 28, and 29, and 27A, 28A, and 29A, respectively. Each of the pads have a diameter of approximately .025 inch and a height of approximtely .020 inch.

Assembly of the three elements making up the sensor (the two diaphragm wafers 1 and 1A and the contact assembly plate 3) is accomplished by silver soldering the copper or nickel conduction pads 27, 28, and 29, and 27A, 28A, and 29A to the coincidentally aligned conductive elements 18 of the mesa feedthroughs 5 and 5A of FIGURES 1 and 4. Thereafter, the silicon diaphragm wafers 1 and 1A are rim alloyed with gold, as indicated in FIGURE 1 by the numeral 2 and fusion sealed under vacuum, in an arrangement in which the flat diaphragm wafers 1 and 1A are rim stressed about the interposed contact plate 3 to provide the bowed shaped structure shown in outline in FIGURE 1.

In the device of FIGURE 1, the probes or contactors 16 and 16A are formed of a hard chrome steel having an effective flat surface of a diameter shown in FIGURES 1, 3, and 6 which is larger than that of the diameter of the plateau 9 of the mesa junction 4, as shown in FIGURE 3. The plateau 9 of the mesa junction 4 may have a diameter of 3 mils while the flat surface of the probe or contactor 16 may have a somewhat greater diameter of, for example, 50 mils. It should be noted that the diameter of the flat surface of the probe contactor 16 should be larger than that of the diameter of the plateau 9 of the mesa junction 4.

While the probe contactor 16 is formed of a relatively hard material such as chrome steel, it is important that the probe or contactor 16 be of a material softer or equal to the hardness of silicon and that the contactor present an effective flat surface bearing on the plateau 9 of the mesa junction 4. It has been found that probes or contactors of a hemispherical shape or of a material harder than silicon may give an undesirable shear line of stress resulting in irreversible strain lines through the junction whereas probes or contactors of a flat surface and of a material softer than or equal to the hardness of silicon do not impart this irreversible strain.

Further, it should be noted that the diameter of the probe contactor 16 should be larger than that of the plateau 9 of the mesa junction 4 so as to determine the effective junction area undergoing compression. Moreover, by making the flat surface of the probe or contactor 16 larger than that of the mesa junction, there is eliminated possible shear lines going down into the junction. It is the generation of the shear lines in the junctions which have been found to lead to unstable outputs.

Operation

The operation of the device of the present invention may be best understood by detailing the function and design of the three key points of construction of the solid state pressure transducer of the present invention including (A) the mesa junction or piezodiode 4 and the mesa feedthroughs 5 grown in the diaphragm wafers 1 and 1A, (B) the contact plate assembly 3 cooperating therewith and positioned within (C) a novel clamshell structural arrangement of the diaphragm wafers 1 and 1A.

The mesa diode 4 and 4A provides a linear output of junction resistance with pressure, and when reverse biased, as for example, with a constant current of 100 microamperes in the avalanche mode, the decrease in the voltage drop across the diodes 4 and 4A is a linear function of the pressure applied to the wafers 1 and 1A, as shown graphically in FIGURE 7. In the clamshell pressure sensor structure of the present invention, it is considered significant that the area of the flat surface of the probe contactors 16 and 16A be greater than the area of the mesa junctions 4 and 4A arranged in cooperative relation therewith so that uniaxial stressing of the mesa junctions 4 and 4A takes place. This serves to minimize the shear lines of stress within the mesa junctions 4 and 4A which might otherwise produce dislocations, plastic flow, and hysteresis in electrical outputs in response to loads.

The contactor plate assembly 3 acts to hold in floating contact, the flat surface of the hard steel probe contactors 16 and 16A against the cathode ends of the diodes 4 and 4A. The mica disc 20 of the contact assembly 3 provides insulation of the dual probe system so that series connection of the diodes 4 and 4A may be made in an anode-to-cathode arrangement, as shown for example, in FIGURE 8.

The contact plate assembly 3 furthermore provides an incompressible dual probe arrangement of the contactors 16 and 16A so that there is no diaphragm travel of the wafers 1 and 1A at their midpoints, minimizing hysteresis and frictional losses in the diaphragm wafers 1 and 1A. It also allows through the use of the mica disc 20 easy assembly. The alignment of the two seventy-five micron (approximately 3 mil) mesa diodes 4 and 4A is no longer hypercritical in that the axes of the diodes 4 and 4A may be misaligned by as much as 40 mils onto the flat surface of the 50 mil diameter probe contactors 16 and 16A and still provide a functioning unit.

The mesa feedthroughs 5 and 5A further permit external connection of both piezodiodes 4 and 4A in a desirable anode-to-cathode series configuration, as shown in FIGURE 8. The arrangement of the mesa feedthroughs 5 and 5A further provide standard three point peripheral contact in two planes to locate and support the contact plate assembly 3 without interfering with the breathing action of the diaphragm wafers 1 and 1A. The arrangement is such then that compression of the diaphragm wafers 1 and 1A will impart a wavy crimp on the periphery of the mica contact plate 20 without imparting torque to the flat surface of the contacting probes 16 and 16A which remain normal to the piezo junctions 4 and 4A. This achieves higher gauge factors in that all diaphragm surfaces exert the pressures applied thereto so as to generate forces at the midpoint of the diodes 4 and 4A.

The overall clamshell sensor construction besides doubling the voltage output and providing hermetic protection for the diodes 4 and 4A in the sensors own reference vacuum also provides for acceleration and vibration stability. Thus, the sensor may be secured in operative relation by suitable clamping means 40 applied about the outer edge 2 whereupon due to the balanced arrangement of the diaphragm wafers 1 and 1A, a displacement of the mesa junction system due to acceleration or low frequency vibration may add pressure to one junction only by relieving pressure from the other junction. Thus, with a linear response from matched diaphragm wafers 1 and 1A, compensation will be provided.

In the modified form of the invention shown in FIGURE 8, the outer side surfaces of the diaphragm wafers 1 and 1A are shown bearing the conductors 15 and 21; and 15A and 21A in a configuration indicating schematically the anode and cathode terminals of the diodes of mesa junctions 4 and 4A and from the mesa feedthroughs 5 and 5A. The diagrammatic showing effected by the shape of the conductors 15 and 21 and 15A and 21A is such as to provide a visual guide to assure the connection by assembly personnel of the diodes 4 and 4A in the proper relation in the electrical circuit of FIGURE 1 in which the diodes 4 and 4A are shown under reverse bias from a constant direct current source 45. Changes in pressure applied to the outer surfaces of the diaphragm wafers 1 and 1A changes in turn the potential across diodes 4 and 4A linearly with the pressure, as shown graphically in FIGURE 7, and measured by the voltmeter 50.

Features of novelty

In the solid state pressure transducer of the present invention, it will be noted that the arrangement of the flat surface probe of contactors 16 and 16A in cooperative relation with the cathode end of the mesa diodes 4 and 4A and with the flat probe having an effective surface of greater diameter than that of the mesa junction provides one of the basic elements of improvement in the device of the present invention and from which the device provides the following desirable effects: (a) linear response to load; (b) long-term stability of signal (use for D.C. purposes); (c) resistance to damage by overload; (d) hysteresis-free response.

The features (a) and (c) may be attributed to the provision of the contactors 16 and 16A of a relatively hard chrome steel so that there is no appreciable wear on the contactor by overload within the normal operating range of the device and which in turn also provides for long-term stability of the output signal effected by the device.

Further, while the metal probe contactors 16 and 16A may be of a relatively hard chrome or like material, the hardness of the metal contactor 16 and 16A is equal to or less than that of the silicon material of the diodes 4 and 4A so as not to effect wear of the mesa junction 4 under overload conditions while the contactors 16 and 16A are not sufficiently soft as to be worn by the silicon material under such overload conditions.

A further feature of the invention lies in the novel so-called clamshell construction of the diaphragm wafers 1 and 1A in cooperation with the contact support assembly 3 mounted therein so as to uniquely provide the following features: (a) acceleration and vibrational stability due to the dual-diode symmetrical construction; and (b) the silicon structure of the wafers 1 and 1A is such that the mesa junction diodes 4 and 4A are grown therein as well as the mesa feedthrough structures 5 and 5A which are thus formed integral with the diaphragm wafers 1 and 1A.

Moreover, while the structure of the diode in FIGURE 3 is shown as N+ material on P material, the inverse structure may also be grown with P+ material on N material in which case the guard ring 7 would be constructed of P material rather than N and the silicon wafer would be initially of N material. Such modified structures would have reverse polarity in the anode and cathode structures shown in FIGURES 2 and 8, and a reverse biasing would be accomplished by a reversal of the connections of the battery 45 from that shown in FIGURE 8.

While two embodiments of the invention have been illustrated and described, various changes in the form and relative arrangement of the parts which will now appear to those skilled in the art may be made without departing from the scope of the invention. Reference is, therefore, to be had to the appended claims for a definition of the limits of the invention.

What is claimed is:

1. A solid state pressure transducer comprising a pair of diaphragm wafers formed of a semiconductor material, each of said wafers having an inner surface and an outer surface, a mesa junction formed in each of said wafers as an integral part thereof and having an inner end portion projecting from the inner surface of the wafer corresponding thereto, a contact supporting device mounted within said diaphragm wafers and in cooperative relation with the inner end portion of the mesa junction, said pair of diaphragm wafers being affixed about the contact supporting device and bonded together at the outer edges of said wafers, the diaphragm wafers being compressed upon application of a force to the outer surfaces thereof so as to cause the contact supporting device to apply a pressure to the mesa junction proportional to the force applied to the outer surfaces of the wafers.

2. The combination defined by claim 1 in which said diaphragm wafers are formed of a semiconductor silicon material, each of said silicon wafers having said mesa junctions formed integral therein as a PN junction, said PN junction providing an electrical conductivity barrier, and the contact supporting device being arranged to apply a uniaxial stress to effect a breakdown voltage across the PN junctions which varies in proportion to the force applied to the outer surfaces of the diaphragm wafers.

3. The combination defined by claim 1 including the pair of diaphragm wafers formed of a semiconductor silicon material, each of the mesa junctions being formed integral with one of the diaphragm wafers so as to provide a piezodiode having one terminal at the outer surface of the diaphragm wafers and an opposite terminal at the inner end of the mesa junction, the contact supporting device including a contact probe having a flat surface contacting the inner end of the mesa junction, the flat surface of the contact probe, having an area greater than that of the inner end of the mesa junction so as to apply a uniaxial stress on the contacting inner surface of the mesa probe.

4. The combination defined by claim 1 including the pair of diaphragm wafers formed of a semiconductor silicon material, each of the mesa junctions being formed integral with one of the diaphragm wafers so as to provide a piezodiode having one terminal at the outer surface of the diaphragm and an opposite terminal at the inner end of the mesa junction, the contact supporting device including a contact probe having a flat surface bearing upon the inner end of the mesa junction, said contact surface of the contact probes having a diameter greater than the diameter of the inner end of the mesa junction and said contact probe being of a hard chrome steel material of a hardness not greater than that of the silicon material of which the piezodiode is formed.

5. The combination defined by claim 1 in which the diaphragm wafers are formed of a semiconductor silicon material, the mesa junction being formed of P and N type materials and including a guard ring of one of said type materials, a region of the other of said type materials encircled by said guard ring, and a thin portion of a high concentration of said one type material extending inwardly from the guard ring and bounded by the guard ring of said one type material at the inner end portion of the mesa junction, and the contact supporting device includes a probe contactor of a hard chrome steel material having a flat surface in contacting relation with the walls of the guard ring at the inner end portion of the mesa junction, the walls of the guard ring at the inner end portion of the mesa junction being formed of the silicon material of the diaphragm wafer and having a diameter less than that of the diameter of the probe contactor, the mesa junction having a hardness equal to or greater than that of the probe contactor so that a uniaxial stress may be applied by the contactor to the mesa junction in response to forces applied to the outer surfaces of the diaphragm wafers to effect an amplified change in an electrical characteristic for a given applied stress.

6. A solid state pressure transducer comprising a silicon member having formed integral therewith a piezodiode, the piezodiode being formed of P and N type materials and including a silicon guard ring of one of said type materials providing a mesa plateau and surrounding a region of silicon of the other of said type materials, and a thin silicon portion of a high concentration of said one type material extending inwardly from the guard ring and bounded by the guard ring of said one type material, a probe contactor operable to apply a variable force, the probe contactor having a flat surface of a greater area than the mesa plateau and bearing upon the inner end of the guard ring, the probe contactor being formed of an electrical conductive material having a hardness not greater than that of the silicon and a hardness sufficient to resist wear upon the contactor bearing in contacting relation upon the mesa plateau so as to provide a uniaxial stress on the piezodiode varying with the application of the force through the contactor to the mesa plateau.

7. In a piezodiode formed of P and N type materials, the combination comprising a silicon guard ring of one of said type materials surrounding a silicon element of the other of said type materials and a thin portion of a greater concentration of said one type material extending inwardly from the guard ring at an inner end of the element of said other type material, the guard ring bounding the said thin portion of said one type material at the inner end of the element of said other type material, a probe contactor operable to apply a variable force, the probe contactor having a flat surface bearing upon the surface of the material of said one type so as to apply a uniaxial stress to the piezodiode varying with the force applied thereby.

8. A solid state pressure transducer comprising a pair of diaphragm wafers formed of a semiconductor silicon material, each of said wafers having an inner surface and an outer surface, a mesa junction formed in each of said wafers as an integral part thereof so as to provide a piezodiode having an electrical terminal at the outer surface of the diaphragm wafer and an inner end opposite electrical terminal portion projecting from the inner surface of the wafer corresponding thereto, a contact supporting device mounted within said diaphragm wafers, said pair of diaphragm wafers being affixed about the contact supporting device and bonded together at the outer edges of said wafers, said contact supporting device carrying a first contact probe having a flat surface contacting the inner end opposite electrical terminal of the piezodiode of one of said diaphragm wafers, and a second contact probe having a flat surface contacting the inner end opposite electrical terminal of the piezodiode of the other of said diaphragm wafers, the flat surface of each of the contact probes having an area greater than that of the inner opposite electrical terminal ends of the piezodiodes so as to apply a uniaxial stress effect on the contacting inner surfaces of the piezodiodes, a plurality of electrical conductors leading from the first contact probe on to the outer surface of one of the diaphragm wafers, a plurality of other electrical conductors leading from the second contact probe on to the outer surface of the other of the diaphragm wafers, the electrical conductors on the outer surface of the one diaphragm wafer being formed in a first open ended triangle indicating anode and cathode terminals of the piezodiode of the one diaphragm wafer, the electrical conductors on the outer surface of the other of the said diaphragm wafers being formed in a second open ended triangle indicating anode and cathode terminals of the piezodiode of the other diaphragm wafer with a means of electrically connecting the conductors leading from the cathode of the piezodiode in the one diaphragm wafer to the anode of the piezodiode of the other diaphragm wafer, and the first and second open ended triangles on the outer surfaces of the pair of diaphragm wafers pointing in opposite directions to indicate a normal direction of flow of current through the piezodiodes of the solid state pressure transducer.

9. The combination defined by claim 8 in which each of said pair of piezodiodes includes a PN junction providing an electrical conductivity barrier, and the flat surface of the first and second contact probes being arranged to apply a uniaxial stress effect to the PN junctions to effect a breakdown voltage across the PN junctions which varies in proportion to the force applied to the outer surfaces of the diaphragm wafers, means to reverse bias the pair of piezodiodes, and means to measure a potential across the piezodiodes which varies with the breakdown voltage effected at the PN junction.

10. A solid state pressure transducer comprising a silicon member having formed integral therewith a piezodiode, the piezodiode being formed of P and N type materials and including a silicon guard ring of one of said type materials providing a mesa plateau and surrounding a region of silicon of the other of said type materials, and a thin silicon portion of a high concentration of said one type material extending inwardly from the guard ring and bounded by the guard ring of said one type material, the mesa plateau having a physically sensitized surface, a probe contactor having a flat smooth surface of a greater area than the sensitized surface of the mesa plateau and bearing upon said sensitized surface, the probe contactor being formed of an electrical conductive material having a hardness not greater than that of the silicon and a hardness sufficient to resist wear upon the contactor bearing in contacting relation upon the sensitized surface of the mesa plateau, means for applying a variable force to said probe contactor so as to provide a uniaxial stress varying with the application of the force through the contactor to the mesa plateau to effect an amplified change in an electrical characteristic for a given applied stress.

11. In a piezodiode formed of P and N type materials, the combination comprising a silicon guard ring of one of said type materials surrounding a silicon element of the other of said type materials and a thin portion of a greater concentration of said one type material extending inwardly from the guard ring at an inner end of the element of said other type material, the guard ring bounding the said thin portion of said one type material at the inner end of the element of said other type material, the thin portion of said one type material having a physically sensitized surface, a probe contactor having a flat surface bearing upon the physically sensitized surface of the material of said one type, means for applying a variable force to said probe contactor so as to apply a uniaxial stress to the piezodiode varying with the force applied thereby to effect an amplified change in an electrical characteristic for a given applied stress.

12. A solid state pressure transducer comprising a pair of diaphragm wafers formed of a semiconductor material, each of said wafers having an inner surface and an outer surface, a mesa junction formed in each of said wafers as an integral part thereof and having an inner end portion projecting from the inner surface of the wafer corresponding thereto, a contact supporting device mounted within said diaphragm wafers and in cooperative relation with the inner end portion of the mesa junction, said pair of diaphragm wafers being affixed about the contact supporting device and bonded together at the outer edges of said wafers, the diaphragm wafers being compressed upon application of a force to the outer surfaces thereof so as to cause the contact supporting device to apply a pressure to the mesa junction proportional to the force applied to the outer surfaces of the wafers, each of the diaphragm wafers being formed of a semiconductor silicon material, each of the mesa junctions being formed of P and N type materials and including a guard ring of one of said type materials, a region of the other of said type materials encircled by said guard ring, and a thin portion of a high concentration of said one type material extending inwardly from the guard ring and bounded by the guard ring of said one type material at the inner end portion of the mesa junction, the inner end portion of each of the mesa junctions having a physically sensitized surface, including fault lines extending from the surface to and through the underlying junction, and the contact supporting device includes a probe contactor of a hard chrome steel material having a flat surface in contacting relation with the sensitized surface of the inner end portion of the mesa junction, the walls of the guard ring at the inner end portion of the mesa junction being formed of the silicon material of the diaphragm wafer and having a diameter less than that of the diameter of the probe contactor, each of the mesa junctions having a hardness equal to or greater than that of the probe contactor so that a uniaxial stress may be applied by the contactor to the mesa junction in response to forces applied to the outer surfaces of the diaphragm wafers to effect an amplified change in an electrical characteristic for a given applied stress.

13. A solid state pressure transducer comprising a diaphragm wafer of a silicon material, said diaphragm wafer having opposite side surfaces, a piezodiode formed of P and N type materials and having a variable breakdown voltage, said piezodiode being formed in the diaphragm wafer and including one portion of one of said type materials, said diaphragm wafer being of another of said type materials, said one portion projecting from one of said side surfaces of the diaphragm wafer to provide a mesa plateau, said one portion including a relatively thin sensitized portion of the one type of said material extending across a free end of the mesa plateau, another portion of the other of said type material being positioned in the one portion of said one type material and extending into the mesa plateau to provide a junction with said relatively thin sensitized portion, said junction being between the P and N type materials of said sensitized portion and said other portion within the mesa plateau, a probe contactor bearing upon said relatively thin sensitized portion of said one type material extending across the free end of the mesa plateau, and the probe contactor being operable to apply a variable force to said thin sensitized portion at the free end of the mesa plateau to vary the breakdown voltage of the piezodiode with stress applied thereto by the probe contactor.

14. The combination defined by claim 13 in which the probe contactor is formed of a chrome steel like material providing a flat surface having an area greater than that of the mesa junction, the flat surface of the probe contactor and the mesa junction of the silicon material having a relative hardness such that the hardness of the mesa junction at least equals the hardness of the flat surface of the probe contactor so as to prevent an irreversible strain from being applied by the probe contactor to the mesa junction.

References Cited
UNITED STATES PATENTS

| | | | |
|---|---|---|---|
| 3,040,218 | 6/1962 | Byczkowiski | 138—33.5 |
| 3,212,327 | 10/1965 | Burke | 73—141 |
| 3,231,795 | 1/1966 | Steinhelper | 317—234 |

OTHER REFERENCES

Bell Laboratories Record, Highly-Sensitive Microphone Uses Transistor as Base, December 1962, pp. 418 and 419.

J. W. HUCKERT, *Primary Examiner.*

R. F. POLISSACK, *Assistant Examiner.*